Sept. 16, 1958
J. FELDMAN
2,852,558
SELECTIVE SEPARATION PROCESS
Filed Sept. 27, 1954
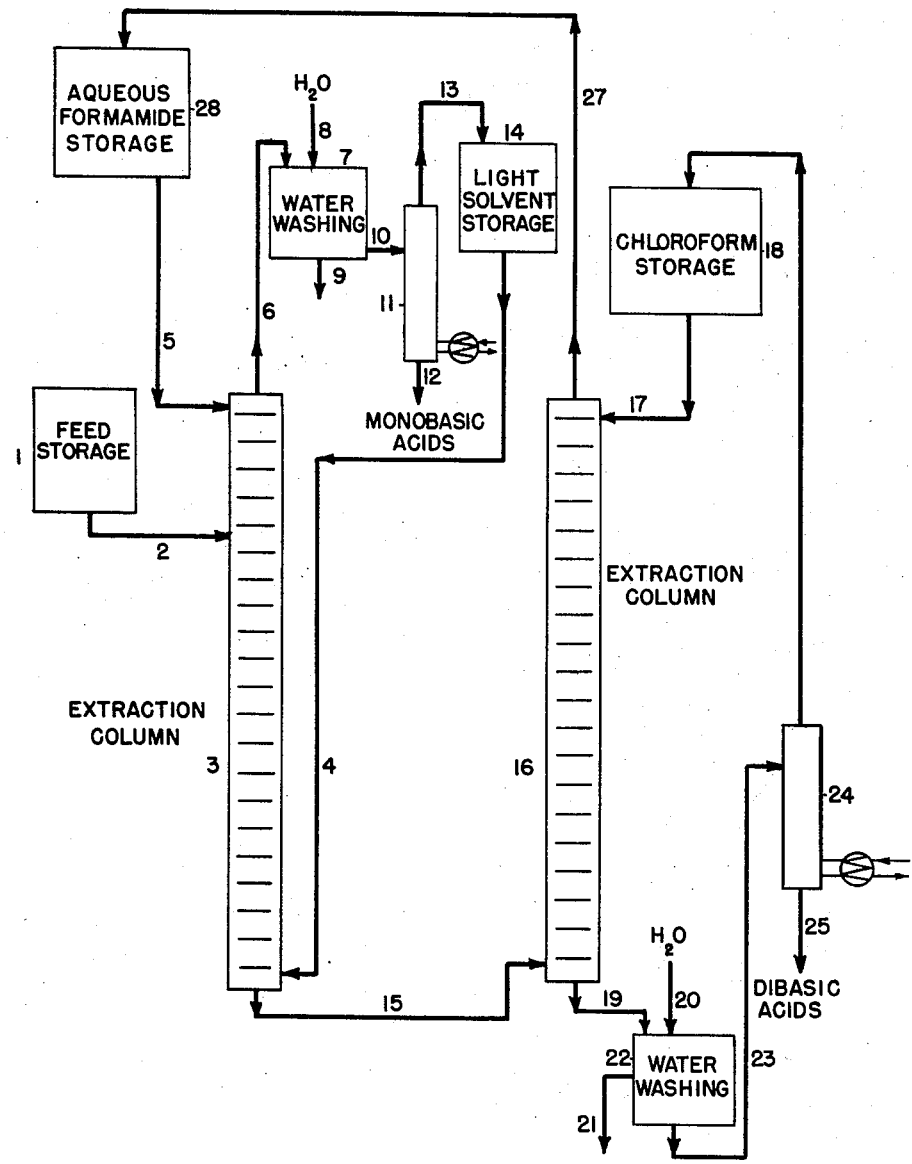
JULIAN FELDMAN
INVENTOR.
BY E. Janet Berry 2,852,558
Patented Sept. 16, 1958

2,852,558

SELECTIVE SEPARATION PROCESS

Julian Feldman, Cincinnati, Ohio, assignor to National Distillers and Chemical Corporation, a corporation of Virginia Application September 27, 1954, Serial No. 458,333

10 Claims. (Cl. 260—537)

This invention relates generally to a method for separating monobasic and dibasic acids, and more particularly, to a method for separating monobasic acids of more than 6 carbon atoms and dibasic acids of ten or more carbon atoms from mixtures containing them.

Monobasic and dibasic acids are produced together and are obtained as mixed reaction products in synthetic processes as well as in the oxidation of synthetic or naturally occurring products such as unsaturated acids and the like. Generally, low molecular weight monobasic acids can be removed by volatilization either in the presence or absence of aqueous or non-aqueous solvents or entrainers. However, high molecular weight monobasic acids of eight carbon atoms or more frequently have approximately equal volatilities with the dibasic acids which accompany them. This prevents their effective separation by distillation. Extraction of solid mixed acids to remove monobasic contaminants has shown that the solution system is much superior. For instance, it has been found that solid sebacic acid containing 10% palmitic acid retains about 1% of the palmitic acid after six heptane extractions.

For example, it has recently been found that if an aliphatic conjugated diolefin is treated with finely dispersed sodium or potassium in a selected ether medium and preferably in the presence of a small amount of polycyclic aromatic hydrocarbon and/or a solid attrition agent at a temperature preferably below 0° C., a mixture of dimetallo derivatives of the dimerized olefin is obtained. These dimetallo derivatives can then be carbonated to the corresponding salts of discarboxylic acids.

If the initial reaction specifically used sodium and butadiene, the product obtained comprises the disodium derivatives of the aliphatic isomeric octadienes. After carbonation, there is obtained a mixture of isomeric unsaturated $C_{10}$ dicarboxylic acids. Upon hydrogenation, mixtures of isomeric saturated $C_{10}$ dicarboxylic acids are obtained. The final hydrogenated mixture from butadiene yields sebacic acid, 2-ethylsuberic acid, and 2,5-diethyladipic acid, together with small amounts of other acids including smaller amounts of monobasic carboxylic acids and some neutral material.

If other diolefins such as isoprene, dimethyl butadiene, the pentadienes, and the like are used initially, the mixture of final products will vary accordingly. These mixtures will ordinarily be composed predominantly of $C_{10}$ to $C_{14}$ dibasic acids, containing varying amounts of the monobasic carboxylic acids having from 5 to 17 carbon atoms.

An object of this invention is to provide a method for separating monobasic and dibasic carboxylic acids.

Another object of this invention is to provide a practical commercial method for separating, recovering and/or purifying monobasic organic acids and dibasic organic acids of eight carbon atoms and more from mixtures containing them. The mixtures can be either saturated or unsaturated carboxylic acids.

Another object is to separate chemically similar impurities from dibasic acids having ten or more carbon atoms.

A further, more specific object is to separate, recover, and/or purify aliphatic $C_{10}$ isomeric dicarboxylic acids from monocarboxylic acids by liquid-liquid extraction using selective solvents.

Monobasic acids are separated from dibasic acids by extraction of a solution of the mixed acids in a selected polar or aqueous-polar liquid medium. First, the mixture is extracted with a non-polar immiscible liquid medium to remove monobasic acids. The mixture is then extracted again with the same or preferably another, more polar, liquid medium which is immiscible with the solution, in order to extract the dibasic acids from that solution or from a solution in which the water content has been increased either by dilution with water or evaporation of a volatile polar liquid medium. The dibasic acids may be recovered by distillation of the polar solvent or by precipitation with another miscible solvent or reagent or in some other suitable manner.

The preferred species of solvent combinations are those wherein the solvent pairs used are essentially immiscible and the phase containing the total acid from which the monobasic acids are to be selectively removed is a highly polar solvent while the phase used to extract the monobasic acids is essentially either an aliphatic hydrocarbon or a non-polar chlorinated hydrocarbon.

More specifically, a dibasic acid or mixture of acids such as a mixture of isomeric $C_{10}$ diacids including sebacic acid, 2-ethylsuberic acid, and 2,5-diethyladipic acid can be separated and purifiied from monobasic acids such as pelargonic acid, lauric acid, stearic acid and others by extraction of a solution of the acid mixture in a polar or aqueous polar solvent such as methanol, ethanol, propanol, ethylene glycol, diethylene glycol, propylene glycol, and the mono and diethers and acetates of the aforesaid glycols, dioxane, formamide, N-dimethyl formamide, acetamide, acetone, acetonylacetone, acetonitrile, ethylene carbonate, nitromethane, acetic anhydride, morpholine, N-methyl morpholine, diacetone alcohol, and other low molecular weight oxygenated or nitrogenous compounds and mixtures of such compounds which in themselves or in aqueous solution are substantially immiscible with an extracting non-polar solvent. The extracting non-polar solvent may be any of the light or heavy hydrocarbons or mixturse of the same, or chlorinated hydrocarbons such as carbon tetrachloride, chloroform, ethylene dichloride, trichloroethylene, or ethers, such as diethyl ether, diisopropyl ether, and the like.

The extraction can be performed concurrently or countercurrently and multistage using conventional equipment such as batch mixing vessels and settling tanks, packed or tray columns, or columns having multistage mixing and settling zones. The operations may be carried out in a continuous or batchwise manner.

The resulting extract contains the monobasic acids, and neutral material. For greater efficiency, it is also contemplated that the extraction can be carried out under reflux conditions. The raffinate contains the dibasic acids substantially free of the monobasic acids. The final residual concentration of monobasic acids is a function of its distribution coefficient between the particular solvent pairs used, initial concentration, ratio of volumes of extracting solvent to raffinate, and the number and efficiency of the extraction stages.

The dibasic acids may be recovered from the solution by any one or a combination of the following methods.

(1) The dibasic acids may be recovered by extracting with another immiscible solvent, followed by distillation of the solvent from the residual acids.

(2) There may be an extraction of a solution of the dibasic acids in a polar solvent with an immiscible solvent to separate the water, followed by distillation to recover both solvents in the overhead and recover the acids in the residue or still bottoms.

(3) Another method, similar to this, is also useful. In this modification, after removal of the first solvent, the addition of another miscible reagent is employed to precipitate the acids, for example, saturated salt solutions can be used.

(4) The solvent can be distilled directly from the residual acids.

(5) The mixture may be diluted with water, followed by extraction with a solvent immiscible with the diluted solvent and having an affinity for the dissolved acids.

(6) The dibasic acids can be precipitated with water or some aqueous reagent.

The polar solvent may be regenerated by distillation or extraction and subsequently recycled for reuse in the system.

The invention has a number of outstanding advantages. It provides a method for separating certain undesirable impurities from dibasic acids. This separation involves the use of commercially available liquid-liquid extraction and distillation equipment and general techniques. The extracting solvents used are commercically available and are essentially completely recoverable. This invention permits the separation and purification of large quantities of material at low cost.

Furthermore, since monobasic acids are chain stoppers in the polymerization of dibasic acids with glycols or diamines, it is frequently necessary to reduce the monobasic acid content of dibasic acids for use in these reactions to less than approximately .027% concentration. This invention provides a method for the substantially complete separation of monobasic acids from mixtures with dibasic acids.

The invention will be further illustrated by the following examples although it is to be understood that other mixtures of acids prepared by different methods can also be separated by this method and other extracting solvents can be used.

EXAMPLE I

In one type of operation, the butadiene and finely dispersed sodium are reacted together in an attrition type apparatus and/or in the presence of a selected polycyclic aromatic hydrocarbon. The disodiooctadienes formed are subsequently carbonated to the sodium salts of the unsaturated $C_{10}$ acids. A catalytic hydrogenation is then carried out to convert the sodium salts or the free unsaturated acids to completely saturated salts or acids. The resulting final reaction mixture is generally an aqueous mixture containing varying amounts of isomeric $C_{10}$ dicarboxylic acids including the linear isomer, sebacic acid, as the sodium salts. It also contains the sodium salts of the valuable branched-chain, $C_{10}$ acids as well as certain monobasic acids with molecular weights from 102 to 260 or more including $C_5$, $C_9$, $C_{13}$, and higher.

Preparation of this material for the countercurrent extraction process can be carried out by any of a number of procedures. For example, the total saturated acids may be liberated with mineral acid, extracted, dried, and the benzene-soluble acids freed from the benzene-insoluble acids by benzene extraction. This benzene solution may then be used in the subsequent extractive process, or the benzene may be removed and some other solvent added. On the other hand, the liquid acids themselves, rather than the sodium salts may be hydrogenated directly, in which case no subsequent liberation from their sodium salt solution is required. It is also within the scope of this invention to separate the mixed, unsaturated acids into monobasic and dibasic acid fractions without a previous hydrogenation.

In every case, there should be employed enough solvent to keep all the acid mixture fluid during the extraction process.

It is to be understood that other mixtures of monobasic and dibasic carboxylic acids obtained by other methods can also be separated readily and satisfactorily by this method.

With reference to the accompanying figure, a concentrated solution of crude dibasic acids containing as major component 2-ethylsuberic acid and smaller quantities of 2,5-diethyladipic acid and sebacic acid, together with minor amounts of the monobasic acids, including pelargonic acid, and tridecanoic acids in 90–100% formamide (ratio of acids to solvent about 3 to 1) is passed from feed storage 1 via line 2. A typical mixture contains about 65% 2-ethylsuberic acid, 20% 2,5-diethyladipic acid, about 5% sebacic acid, and about 10% monobasic acids. Such a solution may be obtained by the solution of the acids in benzene, followed by evaporation of the benzene solution. The resulting liquid acids may be mixed with anhydrous formamide in the ratio of 3 to 4 parts of acid to 1 part of formamide. The mixture is introduced at the fifth stage from the top into a continuous multistage countercurrent extraction column 3. The light solvent fraction is introduced via line 4 into the bottom of the column. This fraction is a mixture of petroleum hydrocarbons of boiling range 70°–120° C. The heavier liquid introduced at the top of the column by line 5 is a dilute solution of formamide in water (approximately 30%). The rates of flow of solvents, feed, and the mixing speed are adjusted to give optimum phase separation and removal of monobasic acids, for example, a ratio of formamide to hydrocarbon to feed of 15:10:2 can be used.

The light effluent is passed from the column by line 6. It is first washed with water in a mixing tank 7. The water is introduced by line 8 and passed to waste by line 9. The effluent is passed by line 10 into a short stripping column 11. The distillate is returned to light solvent storage 14 via line 13. The extract solution may be treated with a caustic wash instead of distilling and the solvent thus regenerated can be recycled. The monobasic acids may be recovered by acidification of the caustic solutions. The bottoms from stripping column 11 are drawn off as a crude monobasic acids by line 12 together with some neutral material. This fraction may be further purified and fractionated by conventional means. The heavier effluent from column 3 is drawn off by line 15 and introduced into another extraction column 16 (10 stage) at the lower section. Chloroform is fed into the top of the column from chloroform storage 18 via line 17 and is withdrawn with extracted dibasic acids at the bottom by line 19. It is then washed in a mixing tank 22 to remove traces of formamide. Wash water is added to tank 22 by line 20 and removed via line 21. The chloroform-diacid mixture is passed by line 23 into an evaporator or distillation column 24. The chloroform is flashed off and returned for recycle to storage 18 by line 26. The purified dibasic acids are removed from the bottom of column 24 by line 25. The light effluent is removed from column 16 by line 27 and is then returned to aqueous formamide storage 28.

Data were collected on the formamide-benzene solvents pair system using the formamide in varying concentrations. The K values where K is the distribution coefficient (conc. in solvent:conc. in formamide) for the various acids studied are shown in Table 1 below. From these data it can be seen that benzene can effectively remove substantially all the monobasic acids having more than 6 carbon atoms regardless of their concentrations from solutions of formamide containing at least 60% water in an efficient liquid-liquid extraction apparatus having a sufficient number of stages, but not remove dibasic acids when they are present in low concentrations, e. g., under 3%.

*Table 1*

| Solvent System | Percent Acid | K |
|---|---|---|
| 99% formamide-benzene | 5% pelargonic | .92 |
| Do | 5% 2-ethylsuberic | .007 |
| 80% formamide-benzene | 50% pelargonic | 17.1 |
| Do | 30% pelargonic | 9.68 |
| Do | 20% pelargonic | 4.57 |
| Do | 10% pelargonic | 7.34 |
| Do | 5% pelargonic | 8.33 |
| Do | 2% pelargonic | 3.21 |
| Do | 1% pelargonic | 2.60 |
| Do | 20% 2-ethylsuberic | .0157 |
| Do | 15% 2-ethylsuberic | .0160 |
| Do | 10% 2-ethylsuberic | .0152 |
| Do | 5% 2-ethylsuberic | .0136 |
| Do | 2% 2-ethylsuberic | .009 |
| 50% formamide-benzene | 5% pelargonic | 2.45 |
| Do | 5% 2-ethylsuberic | .073 |
| 40% formamide-benzene | 10% 2-ethylsuberic | .908 |
| Do | 0.5% pelargonic | 25.6 |
| 30% formamide-benzene | 50% pelargonic | 33.9 |
| Do | 30% pelargonic | 33.8 |
| Do | 20% pelargonic | 39.3 |
| Do | 10% pelargonic | 33.6 |
| Do | 5% pelargonic | 26.3 |
| Do | 2% pelargonic | 14.8 |
| Do | 1% pelargonic | 11.5 |
| Do | .5% pelargonic | 18.4 |
| Do | .1% pelargonic | 4.46 |
| Do | .05% pelargonic | 2.12 |
| Do | 20% 2-ethylsuberic | 4.48 |
| Do | 15% 2-ethylsuberic | 3.54 |
| Do | 10% 2-ethylsuberic | 2.27 and 2.21 |
| Do | 5% 2-ethylsuberic | .887 |
| Do | 2% 2-ethylsuberic | .191 |
| Do | 1% 2-ethylsuberic | .0887 |
| 20% formamide-benzene | 5% pelargonic | 16.6 |
| Do | 5% 2-ethylsuberic | 1.90 |

The data on the formamide-light solvent naphtha (heptane) pair are shown in Table 2 and those for formamide-chloroform are shown in Table 3. From the information in Table 3, it is apparent that concentrations of dibasic acids down to about 1% may be extracted from aqueous formamide solutions by chloroform.

*Table 2*

| Solvent System | Percent Acid | K |
|---|---|---|
| 30% formamide-heptane | 1% pelargonic | 5.41 |
| Do | .5% pelargonic | 4.38 |
| Do | .1% pelargonic | 1.98 |
| Do | .05% pelargonic | 2.10 |
| Do | .036% pelargonic | 3.66 |
| Do | 10% 2-ethylsuberic | .0056 |
| Do | 2% low melting diethyladipic | .0020 |
| Do | 1% high melting diethyladipic | .0017 |
| Do | .5% stearic | 7.26 |
| Do | .5% valeric | .166 |
| Do | .1% caprylic | 6.44 |
| Do | .1% caproic | .211 |

*Table 3*

| Solvent System | Percent Acid | K |
|---|---|---|
| 30% formamide-CHCl₃ | 5% 2-ethylsuberic | 3.41 |
| Do | 2% 2-ethylsuberic | 1.44 |
| Do | 1% 2-ethylsuberic | .650 |
| Do | .5% 2-ethylsuberic | .321 |
| Do | .1% 2-ethylsuberic | .207 |
| Do | 2% high melting diethyladipic | .718 |
| Do | 1% high melting diethyladipic | .137 |
| Do | .5% high melting diethyladipic | .203 |
| Do | 1% low melting diethyladipic | .492 |

EXAMPLE II

This operation is the same as Example I except that CCl₄ is used instead of the hydrocarbon solvent and the positions of the entering solvents in the first column are reversed so that formamide enters at the bottom and the heavier CCl₄ at the top. The distribution coefficients for 5% pelargonic acid and 5% ethylsuberic acid in the system, 50% aqueous formamide-CCl₄, are 10.5 and .0083 respectively.

EXAMPLE III

This procedure is the same as that of Example II except that aqueous acetamide is used instead of aqueous formamide. The pertinent data on the solvent pairs are shown in Table 4. These data show that CCl₄, heptane, CHCl₃, and isopropyl ether are among the non-polar solvents which can be used in conjunction with aqueous acetamide, the first two for removing monobasic acids, and the last two for recovering dibasic acids.

*Table 4*

| Solvent System | Percent Acid | K |
|---|---|---|
| 50% acetamide-CCl₄ | 5% pelargonic | 9.42 |
| Do | 5% 2-ethylsuberic | .0046 |
| 50% acetamide-CHCl₃ | 5% 2-ethylsuberic | 2.10 |
| 30% acetamide-heptane | 1% pelargonic | 30.34 |
| Do | .5% pelargonic | 17.90 |
| Do | .1% pelargonic | 2.63 |
| Do | 5% 2-ethylsuberic | .0039 |
| 30% acetamide-CHCl₃ | 2% 2-ethylsuberic | 2.38 |
| 30% acetamide-isopropyl ether | 1% 2-ethylsuberic | 1.88 |
| Do | .5% 2-ethylsuberic | 1.63 |
| Do | .5% high melting diethyladipic | 1.66 |
| Do | .5% low melting diethyladipic | 1.65 |

EXAMPLE IV

The crude mixture of dibasic acids is dissolved in a 40% dioxane solution in water and introduced near the top of a continuous countercurrent extraction column. A light petroleum ether solvent (heptane) is introduced at the bottom of the column and is passed countercurrently through the descending aqueous phase. The light effluent is flashed off from the extracted monobasic acids, washed, and returned to solvent storage. The aqueous effluent is steam distilled until all the dioxane is removed as the azeotrope (B. P. 87°–82% dioxane). This distillate (dioxane-water mixture) is reconstituted to proper concentration and returned to solvent storage. The aqueous residue is allowed to cool and the diacids separated by filtration. The data on the solvent pair dioxane-heptane are shown in Table 5.

*Table 5*

| Solvent System | Percent Acid | K |
|---|---|---|
| 40% dioxane-heptane | 5% pelargonic | 18.7 |
| Do | 1% pelargonic | 22.0 |
| Do | 5% 2-ethylsuberic | .0117 |
| 20% dioxane-heptane | 1% pelargonic | 26.7 |
| Do | 5% 2-ethylsuberic | .0099 |

EXAMPLE V

This procedure is the same as that of Example IV above except that 30–50% methanol is substituted for aqueous dioxane. The boiling point of methanol is 64° C. It does not form an azeotrope with water. The data are shown in Table 6.

*Table 6*

| Solvent System | Percent Acid | K |
|---|---|---|
| 60% methanol-benzene | 5% pelargonic | 7.38 |
| Do | 5% 2-ethylsuberic | .148 |
| 40% methanol-cyclohexane | .1% pelargonic | 13.2 |
| Do | 5% 2-ethylsuberic | .0101 |
| 30% methanol-cyclohexane | .1% pelargonic | 26.4 |
| Do | 5% 2-ethylsuberic | .0156 |

EXAMPLE VI

This is the same procedure as Example IV above except that 30–50% aqueous acetonitrile is substituted for aqueous dioxane. The boiling point of the azeotrope is 76° C. and it contains 14% water. The data are shown in Table 7 below.

Table 7

| Solvent System | Percent Acid | K |
|---|---|---|
| 50% acetonitrile-heptane | 5% pelargonic | 1.38 |
| Do | 5% 2-ethylsuberic | .0010 |
| 30% acetonitrile-heptane | 0.5% pelargonic | 12.4 |
| Do | 5% 2-ethylsuberic | .003 |

EXAMPLE VII

This is also the same procedure as Example IV except that nitromethane is substituted for aqueous dioxane. Nitromethane boils at 101° C. The solvent is then evaporated. The data on the solvent pair are shown in Table 8.

Table 8

| Solvent System | Percent Acid | K |
|---|---|---|
| nitromethane-heptane | 5% pelargonic | 2.19 |
| Do | 5% 2-ethylsuberic | .012 |
| Do | 0.5% pelargonic | 5.10 |
| Do | 0.9% stearic | 25.4 |

EXAMPLE VIII

This procedure is the same as that of Example VII except that acetic anhydride (B. P. 139.6) is substituted for nitromethane. The data are shown in Table 9 below.

Table 9

| Solvent System | Percent Acid | K |
|---|---|---|
| 5% acetic-anhydride-heptane | 5% pelargonic | 1.12 |
| Do | 5% 2-ethylsuberic | .0033 |

EXAMPLE IX

The crude acid mixture is dissolved in a 50% aqueous acetonyl-acetone solution and introduced near the top of a continuous countercurrent extraction column. A light petroleum solvent (naphtha) is introduced at the bottom of the column and passed countercurrently through the descending aqueous phase. The light effluent is flashed off the extracted monobasic acids, and washed and returned to solvent storage. The aqueous phase is extracted continuously with chloroform, to separate the acetonyl-acetone and dibasic acids from the water. The chloroform extract is then distilled and acetonyl-acetone flashed off under reduced pressure (B. P. 194° C.). The data on the solvent pair are shown in Table 10.

Table 10

| Solvent System | Percent Acid | K |
|---|---|---|
| 50% acetonylacetone-heptane | 5% pelargonic | 2.90 |
| Do | 5% 2-ethylsuberic | .0016 |

EXAMPLE X

This is the same procedure as Example IX except ethylene carbonate is used instead of acetonyl-acetone. Carbon tetrachloride is preferable as a solvent. The data are shown in Table 11.

Table 11

| Solvent System | Percent Acid | K |
|---|---|---|
| 60% ethylene carbonate-benzene | 5% pelargonic | 26.6 |
| Do | 5% 2-ethylsuberic | 3.44 |
| 50% ethylene carbonate-CCl₄ | 5% pelargonic | 8.66 |
| Do | 5% 2-ethylsuberic | .0086 |

EXAMPLE XI

This is the same procedure as Example I except that diisopropyl ether is used instead of chloroform. The ether is introduced at the bottom of column 16, while the formamide is introduced at the top of the column. The data are shown in Table 12. They indicate that concentrations of dibasic acids down to less than 0.2% can be extracted from the aqueous formamide solutions.

Table 12

| Solvent System | Percent Acid | K |
|---|---|---|
| 30% formamide-isopropyl ether | 1% 2-ethylsuberic | 1.76 |
| Do | .5% 2-ethylsuberic | 1.47 |
| Do | .2% 2-ethylsuberic | .832 |
| Do | 1% low melting diethyl-adipic | 2.13 |

EXAMPLE XII

This procedure is the same as that of Example XI except that diethyl ether is used instead of diisopropyl ether. The data are shown in Table 13.

Table 13

| Solvent System | Percent Acid | K |
|---|---|---|
| 30% formamide-diethyl ether | 1% 2-ethylsuberic | 4.98 |
| Do | 1% high melting diethyl-adipic | 5.27 |
| Do | 1% low melting diethyl-adipic | 5.77 |

What is claimed is:

1. A liquid-liquid extraction process for the separation of mixtures of acidic compounds containing monobasic and dibasic acids of relatively close molecular weights, the major portion of said acids having at least eight carbon atoms, which includes the steps of extracting a solution of the mixed acids as free acids dissolved in a liquid medium with a relatively non-polar, immiscible liquid medium, whereby the monobasic acids are extracted to provide an extract phase of the monobasic acids and a raffinate phase of said dibasic acids, and extracting the raffinate phase with a relatively polar, liquid medium, whereby the dibasic acids are extracted, and recovering the dibasic acids from said relatively polar liquid medium.

2. A liquid-liquid extraction process for the separation of monobasic and dibasic acids having relatively close molecular weights and having approximately equal volatilities, the monobasic acids being in the range of $C_8$ to $C_{17}$ and the dibasic acids being in the range of $C_{10}$ to $C_{14}$, which comprises the steps of initially extracting a solution of the monobasic and dibasic acids as free acids with a relatively non-polar, immiscible solvent, whereby substantially all of the monobasic acids are extracted to provide an extract phase of said monobasic acids in said non-polar solvent and a raffinate phase comprising said dibasic acids, extracting said raffinate with a relatively polar solvent, whereby substantially all of the dibasic acids are extracted, and recovering the dibasic acids from said relatively polar solvent.

3. A liquid-liquid extraction process for the separation and recovery of monobasic and dibasic acids of relatively close molecular weights, the major portion of said acids having at least eight carbon atoms, which comprises the steps of contacting a solution containing the monobasic and dibasic acids as free acids with a relatively non-polar, immiscible liquid which is a solvent for the monobasic acids, separating the resulting mixture into an extract and a raffinate, recovering the monobasic acids from the extract, and recovering the dibasic acids from the raffinate.

4. A liquid-liquid extraction process for the separation and recovery of aliphatic $C_{10}$ isomeric dibasic acids from monobasic acids which comprises the steps of contacting a solution of the mixed acids as free acids with a relatively non-polar, immiscible liquid which is a solvent for the monobasic acids, separating the resulting mixture into an extract and a raffinate, recovering the monobasic acids from the extract, and recovering the dibasic acids from the raffinate.

5. A liquid-liquid extraction process for the separation and recovery of aliphatic $C_{10}$ isomeric dibasic acids from monobasic acids which comprises the steps of contacting an aqueous solution of the mixed acids as free acids with a relatively non-polar, immiscible liquid which is a solvent for the monobasic acids, separating the resulting mixture into an extract and a raffinate, recovering the monobasic acids from the extract, and contacting the resulting raffinate with a relatively polar solvent, which is a solvent for the dibasic acids, separating the resulting mixture into an extract and a raffinate and recovering the dibasic acids from the extract.

6. A liquid-liquid extraction process for the separation, recovery and purification of aliphatic $C_{10}$ isomeric dibasic acids including sebacic acid, 2-ethylsuberic acid, and 2,5-diethyladipic acid from monobasic acids which comprises the steps of initially extracting an aqueous solution of the mixed acids as free acids with a relatively non-polar, immiscible solvent, whereby substantially all of the monobasic acids are extracted to provide an extract phase of said monobasic acids in said non-polar solvent and a raffinate phase, extracting said raffinate with a relatively polar solvent whereby substantially all of the dibasic acids are extracted, and recovering the dibasic acids from said relatively polar solvent.

7. A liquid-liquid extraction process for the separation and recovery of aliphatic $C_{10}$ isomeric dibasic acids including sebacic acid, 2-ethylsuberic acid, and 2,5-diethyladipic acid from monobasic acids which comprises the steps of extracting a solution of said dibasic and monobasic acids as free acids with a relatively non-polar, immiscible liquid which is a selective solvent for the monobasic acids, separating the resulting mixture into an extract and a raffinate, recovering the monobasic acids from the extract, and recovering the dibasic acids from the raffinate.

8. A liquid-liquid extraction process for separation of monobasic acids from mixtures thereof with dibasic acids of relatively close molecular weight, a major portion of said acids having at least 8 carbon atoms, which comprises dissolving said mixture of acids in a relatively polar liquid thereby providing a solution of said mixed acids as free acids in the polar liquid, and extracting said solution with a relatively non-polar immiscible liquid to selectively extract monobasic acids from said solution thereby obtaining an extract containing selectively extracted monoacids and a raffinate comprising dibasic acids.

9. A liquid-liquid extraction process for the separation of monobasic acids from a mixture thereof with dibasic acids including 2-ethylsuberic acid and 2,5-diethyladipic acid which comprises dissolving said acid mixture in aqueous acetontrile, and extracting the resulting aqueous acetonitrile solution with hexane thereby obtaining a hexane extract comprising selectively extracted monobasic acids and a raffinate comprising the non-extracted dibasic acids.

10. A liquid-liquid extraction process for the separation of monobasic acids from an admixture with dibasic acids, the monobasic acids being in the range of $C_8$ to $C_{17}$ and the dibasic acids being in the range of $C_{10}$ to $C_{14}$, which comprises dissolving said acid mixture in a relatively polar liquid to obtain a solution of said mixed acids as free acids in the polar liquid, and extracting said solution with a relatively non-polar immiscible liquid to selectively extract monobasic acids from said solution, thereby obtaining an extract containing selectively extracted monoacids and a raffinate comprising dibasic acids.

References Cited in the file of this patent

UNITED STATES PATENTS

| | | |
|---|---|---|
| 2,245,945 | Van Dijck et al. | June 17, 1941 |
| 2,352,461 | Walker | June 27, 1944 |
| 2,365,290 | Price et al. | Dec. 19, 1944 |
| 2,614,122 | Mikeska | Oct. 14, 1952 |
| 2,749,364 | Greenberg | June 5, 1956 |